US012097410B2

(12) United States Patent
Bohlender

(10) Patent No.: US 12,097,410 B2
(45) Date of Patent: Sep. 24, 2024

(54) BALL-WASHING DEVICE

(71) Applicant: Peter W. Bohlender, Brantford (CA)

(72) Inventor: Peter W. Bohlender, Brantford (CA)

(73) Assignee: Clean Flight Golf Ltd., Ontario (CA)

( * ) Notice: Subject to any disclaimer, the term of this patent is extended or adjusted under 35 U.S.C. 154(b) by 0 days.

(21) Appl. No.: 17/541,971

(22) Filed: Dec. 3, 2021

(65) Prior Publication Data

US 2022/0176208 A1 Jun. 9, 2022

Related U.S. Application Data

(60) Provisional application No. 63/121,549, filed on Dec. 4, 2020.

(51) Int. Cl.
*A63B 47/04* (2006.01)
*B08B 1/12* (2024.01)

(52) U.S. Cl.
CPC ................ *A63B 47/04* (2013.01); *B08B 1/12* (2024.01)

(58) Field of Classification Search
CPC ..... A63B 47/04; A63B 2102/32; A63B 57/60; A63B 60/36; A63B 2047/043; A63B 2047/046; B08B 1/002; A47L 25/04; A46B 2200/3073; A46B 9/02; A46B 9/026
USPC ....... 15/160, 21.2, 104.92, 21.1, 104.04, 88, 15/88.1, 88.3, 88.4, 36, 3, 6, 210.1, 15/218.1; D21/795; D3/257; 206/315.9
See application file for complete search history.

(56) References Cited

U.S. PATENT DOCUMENTS 1,320,633 A * 11/1919 Minkler .................... A46B 9/02 15/21.2
2,807,037 A * 9/1957 Garske .................... A63B 47/04 15/21.2
2,822,558 A * 2/1958 Vandervort ............ A63B 47/04 15/21.2
3,044,089 A * 7/1962 Boynton ................ A63B 47/04 15/21.2
3,101,497 A * 8/1963 Derkocz ................ A63B 47/04 15/21.2
3,271,802 A * 9/1966 Thompson ............. A63B 47/04 15/21.2
3,678,526 A * 7/1972 Burkholder ............ A63B 47/04 15/21.2

(Continued)

*Primary Examiner* — David S Posigian
*Assistant Examiner* — Jacob Adam Montgomery
(74) *Attorney, Agent, or Firm* — Bereskin & Parr LLP

(57) ABSTRACT

A ball-washing device is described herein. The device includes a housing having a top wall, a bottom wall and a peripheral wall extending between the top wall and the bottom wall to define a cavity of the housing. The top wall has an opening shaped to receive a ball into the cavity and a pair of guides positioned on an inner surface of the opening. The peripheral wall has at least one brush positioned on an inner surface of the peripheral wall to engage the ball when the ball is in the cavity. The device also includes a plunger configured to slidingly engage the housing. The plunger has a body portion configured to slidingly engage the guides as the plunger is inserted into and removed from the cavity through the opening. The body portion is also configured to retain the ball as plunger is inserted into and removed from the cavity through the opening. The plunger also has a cap coupled to the body portion and configured to rotate relative to the body portion to secure the plunger to the housing when the body portion is in the cavity.

18 Claims, 15 Drawing Sheets

(56) References Cited

U.S. PATENT DOCUMENTS

| | | | | | |
|---|---|---|---|---|---|
| 4,344,203 | A * | 8/1982 | Gerrick | A63B 47/04 15/21.2 |
| 4,442,564 | A | 4/1984 | Berry | |
| 4,750,232 | A | 6/1988 | Doney | |
| 4,945,596 | A * | 8/1990 | Chang | A63B 47/04 15/21.2 |
| 5,555,586 | A * | 9/1996 | Dorrich | A63B 47/04 15/21.2 |
| 5,638,567 | A * | 6/1997 | Danyluk | A63B 47/04 15/21.2 |
| 5,822,820 | A | 10/1998 | Heisler | |
| 6,036,386 | A | 3/2000 | McDonald | |
| 2005/0188482 | A1 * | 9/2005 | Matthews | A63B 47/04 15/21.2 |
| 2011/0079732 | A1 * | 4/2011 | Kreitenberg | A61L 2/10 250/455.11 |

* cited by examiner

BALL-WASHING DEVICE

CROSS REFERENCE

This application claims the benefit of U.S. Provisional Patent Application No. 63/121,549 titled "Ball-Washing Device" filed on Dec. 4, 2021, the entire contents of which are hereby incorporated herein by reference in their entirety.

TECHNICAL FIELD

This disclosure relates generally to ball-washing devices, and more specifically, to portable golf ball-washing devices.

BACKGROUND

The aim of the game of golf is to hit a ball with a club from a tee into a hole in as few shots as possible. The exterior surface or cover of the golf ball is made from a thin layer of synthetic resin. Most golf balls typically have between 300 and 500 dimples, each having a depth of about 0.010 inch. The lift and drag forces on the golf ball as it flies through the air are very sensitive to the depth of the dimples on the exterior surface. As the golf ball is used during a round of golf, grass and dirt tend to adhere to the exterior surface of the golf ball within the dimples. This grass and dirt can negatively affect the flight path of the golf ball.

In response to grass and dirt adhering to the exterior surface of their golf ball, golfers tend to clean their ball between holes to ensure that the flight of subsequent shots is optimal. Golf courses have traditionally placed golf ball-washing devices around golf courses for golfers to use. However, golf ball-washing devices are expensive to purchase and require maintenance by the golf course.

Golf ball-washing devices for carrying by, or capable of being carried by a golfer, by being attached to their person, golf bag, golf cart, golf cart handle, or the like, have been previously developed. However, these previous devices typically have one or more disadvantages in their design, including but not limited to being unable to effectively and efficiently clean the entire surface of a golf ball, being expensive to produce, being large and/or heavy, and being prone to fluid loss.

Accordingly, there is a need for improved ball-washing devices and, specifically, for improved portable golf ball-washing devices.

SUMMARY

In accordance with a broad aspect, a ball-washing device is described herein. The device includes a housing having a top wall, a bottom wall and a peripheral wall extending between the top wall and the bottom wall to define a cavity of the housing. The top wall has an opening shaped to receive a ball into the cavity and a pair of guides positioned on an inner surface of the opening. The peripheral wall has at least one brush positioned on an inner surface of the peripheral wall to engage the ball when the ball is in the cavity. The device also includes a plunger configured to slidingly engage the housing. The plunger has a body portion configured to slidingly engage the guides as the plunger is inserted into and removed from the cavity through the opening. The body portion is also configured to retain the ball as plunger is inserted into and removed from the cavity through the opening. The plunger also has a cap coupled to the body portion and configured to rotate relative to the body portion to secure the plunger to the housing when the body portion is in the cavity.

In at least one embodiment, the housing includes an upper housing portion coupled to a lower housing portion, the upper housing portion having the top wall and the opening and the lower housing portion having the bottom wall and the peripheral wall.

In at least one embodiment, the cap is coupled to the body portion by a fastener to provide for the cap to rotate relative to the body portion.

In at least one embodiment, the peripheral wall has six sides to provide for the housing to have a hexagonal shape.

In at least one embodiment, the guides are positioned on opposite sides of the housing.

In at least one embodiment, four brushes are positioned adjacent to the inner surface of the peripheral wall.

In at least one embodiment, each of the brushes is positioned to be equidistant from each other within the cavity.

In at least one embodiment, each of the brushes are retained against the peripheral wall by a respective retaining member.

In at least one embodiment, each of the brushes are secured to the top wall.

In at least one embodiment, the retaining member is a divider wall extending upwardly from the bottom wall of the container.

In at least one embodiment, the four brushes are positioned adjacent to the inner surface of the peripheral wall of the housing and two of the four brushes extends inwardly into the cavity a distance greater than the other two brushes.

In at least one embodiment, the guides include two guide members integral with the peripheral wall of the housing, the two guide members defining a slot configured to receive at least a portion of the body portion to guide the plunger as it slides within the cavity.

In at least one embodiment, the guide members extend inwardly from the inner surface of the opening to engage sides of the plunger as it passes through the opening.

In at least one embodiment, the guide members extend upwardly to an upper edge of a collar of the housing.

In at least one embodiment, the plunger has a width that is less than a diameter of the opening.

In at least one embodiment, the housing includes a collar having a slot and the cap is configured to be rotatably secured to the housing via the slot.

In at least one embodiment, the cap includes one or more projections configured to be received in the slot.

In at least one embodiment, the fastener is received in a downwardly extending portion of the cap.

In at least one embodiment, the fastener passes through an aperture in a neck portion of the body of the plunger and is received in a downwardly extending portion of the cap.

In at least one embodiment, the neck portion surrounds the downward extending projection.

These and other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

Figure 1:
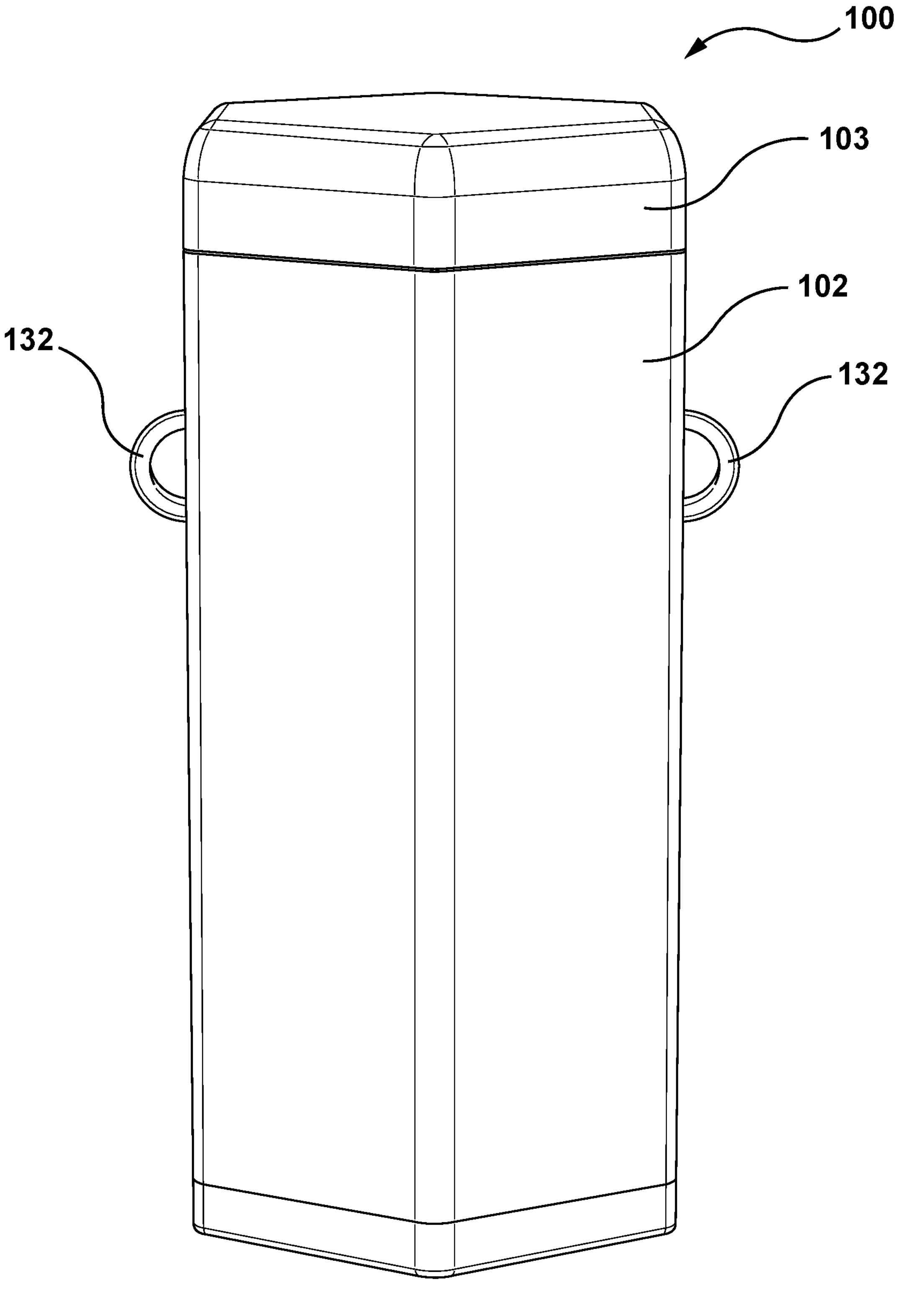
FIG. 1 is a front perspective view of a ball-washing device according to at least one embodiment described herein.

Further aspects and features of the example embodiments described herein will appear from the following description taken together with the accompanying drawings.

DETAILED DESCRIPTION

Various apparatuses and methods are described below to provide an example of at least one embodiment of the claimed subject matter. No embodiment described below limits any claimed subject matter and any claimed subject matter may cover apparatuses and methods that differ from those described below. The claimed subject matter are not limited to apparatuses and methods having all of the features of any one apparatus or method described below or to features common to multiple or all of the apparatuses or methods described below. It is possible that an apparatus or method described below is not an embodiment of any claimed subject matter. Any subject matter that is disclosed in an apparatus or method described herein that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

It should be noted that terms of degree such as "substantially", "about" and "approximately" as used herein mean a reasonable amount of deviation of the modified term such that the end result is not significantly changed. These terms of degree should be construed as including a deviation of the modified term, such as 1%, 2%, 5%, or 10%, for example, if this deviation does not negate the meaning of the term it modifies.

Furthermore, the recitation of any numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation up to a certain amount of the number to which reference is being made, such as 1%, 2%, 5%, or 10%, for example, if the end result is not significantly changed.

It should also be noted that, as used herein, the wording "and/or" is intended to represent an inclusive—or. That is, "X and/or Y" is intended to mean X, Y or X and Y, for example. As a further example, "X, Y, and/or Z" is intended to mean X or Y or Z or any combination thereof. Also, the expression of A, B and C means various combinations including A; B; C; A and B; A and C; B and C; or A, B and C.

The following description is not intended to limit or define any claimed or as yet unclaimed subject matter. Subject matter that may be claimed may reside in any combination or sub-combination of the elements or process steps disclosed in any part of this document including its claims and figures. Accordingly, it will be appreciated by a person skilled in the art that an apparatus, system or method disclosed in accordance with the teachings herein may embody any one or more of the features contained herein and that the features may be used in any particular combination or sub-combination that is physically feasible and realizable for its intended purpose.

Recently, there has been a growing interest in developing new ball-washing devices, and specifically, new portable golf ball-washing devices.

In at least one embodiment described herein, it is desirable to provide a ball-washing device that is portable and can be conveniently carried by a user, either directly (e.g. on their person) or indirectly (e.g. on a golf cart or a golf bag), for example, while playing a round of golf. To be conveniently carried or otherwise portable, it is desirable for the ball-washing device to have a compact design (e.g. a small footprint), to be made from lightweight materials and to be sufficiently sealable to inhibit fluid from leaking from the device.

In at least one embodiment described herein, it is also desirable to provide a ball-washing device that may be used to clean the entire surface of a golf ball effectively (i.e. removes substantially all of the dirt and/or grass and/or stains thereon, including but not limited to being able to remove grass and dirt from the dimples of the golf ball) and efficiently (i.e. with a minimal amount of effort by the user and/or with a minimum amount of cleaning fluid therein).

In at least one embodiment described herein, it is also desirable to provide a ball-washing device that can be economically produced.

In at least one embodiment described herein, a ball-washing device is described. The ball-washing device includes a housing having internal brushes and a plunger that is slidably engages the housing. The plunger is configured to retain a golf ball and slide up and down within (e.g. into and out of) the housing so that internal brushes engage an outer surface of the ball when it is supported by the plunger to remove dirt and/or other impurities (e.g. markings, etc.) thereon. The housing is generally hollow and sized and shaped to retain a fluid and detergent to aid in washing the ball. The fluid and the detergent may be manually added to the housing (e.g. through the opening) by a user. For instance, before use, the user may add a few drops of a detergent and fill the housing to a predetermined level (e.g. approximately half-full) with a fluid (e.g. water) to provide for washing a ball therein.

To operate the ball-washing devices described herein, the user may hold the housing of the device with one hand and slidably remove a plunger of the device from the housing by, for example, grasping a cap of the device and unscrewing the cap from the housing. Once unscrewed, the plunger may be withdrawn from the housing. In some embodiments, the cap may be directly attached to the plunger. In at least one embodiment, the cap of the plunger is coupled to a body portion of the plunger and rotatable relative to the body portion of the plunger to provide for the cap to be secured to the housing and unsecured to the housing. In this embodiment, the cap is configured to rotate relative to the body portion without the body portion of the plunger rotating within the cavity. Once the cap is unsecured from the housing, the user may pull the plunger upwardly relative to the housing and load a ball into or onto the plunger. In at least one embodiment, a portion of the plunger may be configured to provide for the plunger to be retained in the housing when the plunger is lifted upwardly. In at least one embodiment, the plunger is configured to be completely removable from the housing. This may provide for the user to hold the housing in one hand and load the ball onto the retainer with their other hand. Once the ball is loaded, the plunger can be raised and lowered within the housing to clean the ball. As the ball is moved up and down in the housing, it enters and exits the soapy water solution, becomes wet and engages the internal brushes. A rubber gasket may be incorporated into an opening of the housing to minimize water splashing out of the housing while in use.

Turning to the figures, FIG. 1 shows a front perspective view of a ball-washing device 100 according to at least one embodiment. Ball-washing device 100 includes a housing 102 and a cap 103 coupled to the housing 102.

Figure 2:
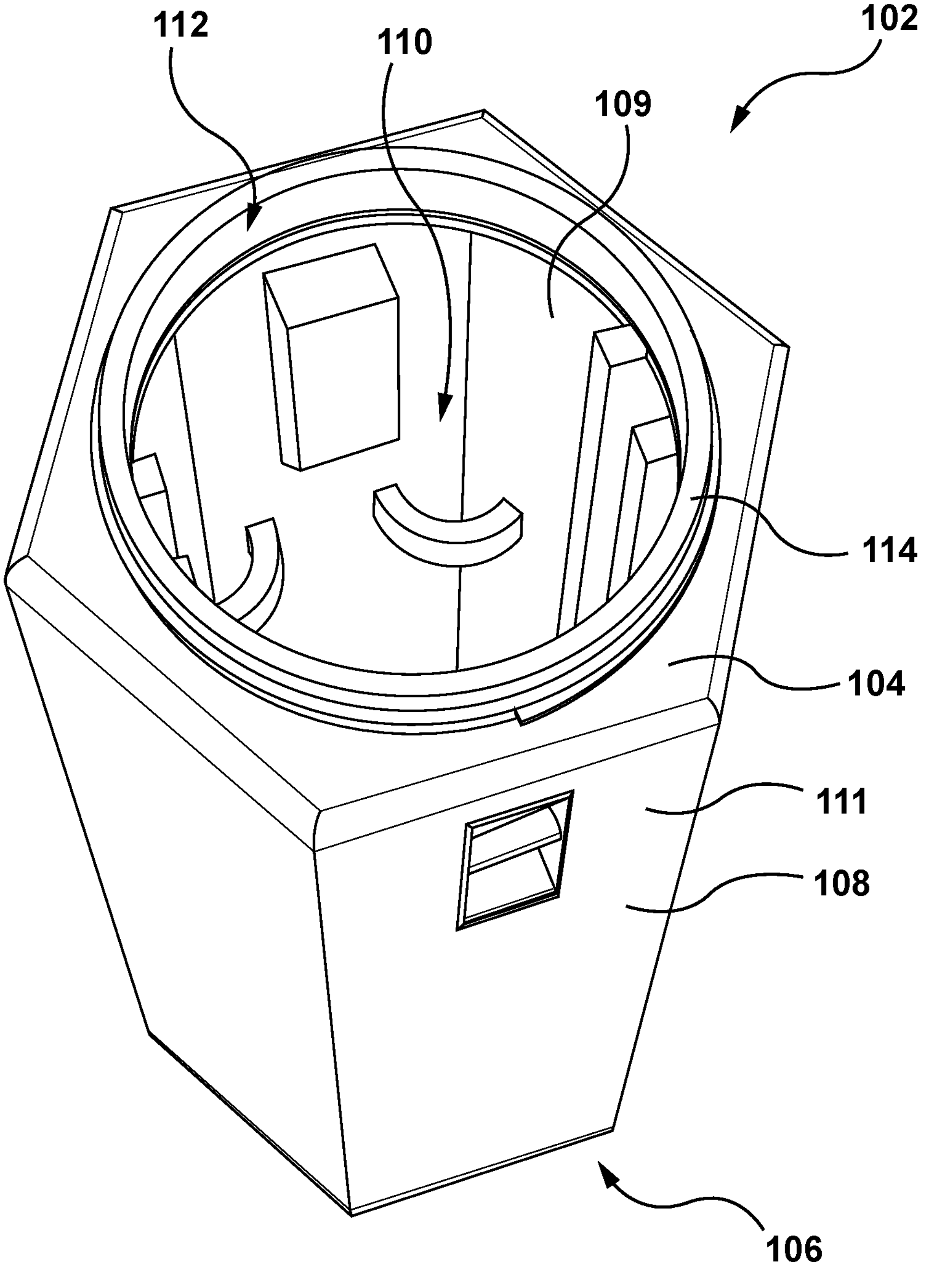
FIG. 2 is a perspective view from above of a housing of a ball-washing device according to at least one embodiment described herein.
Figure 3:
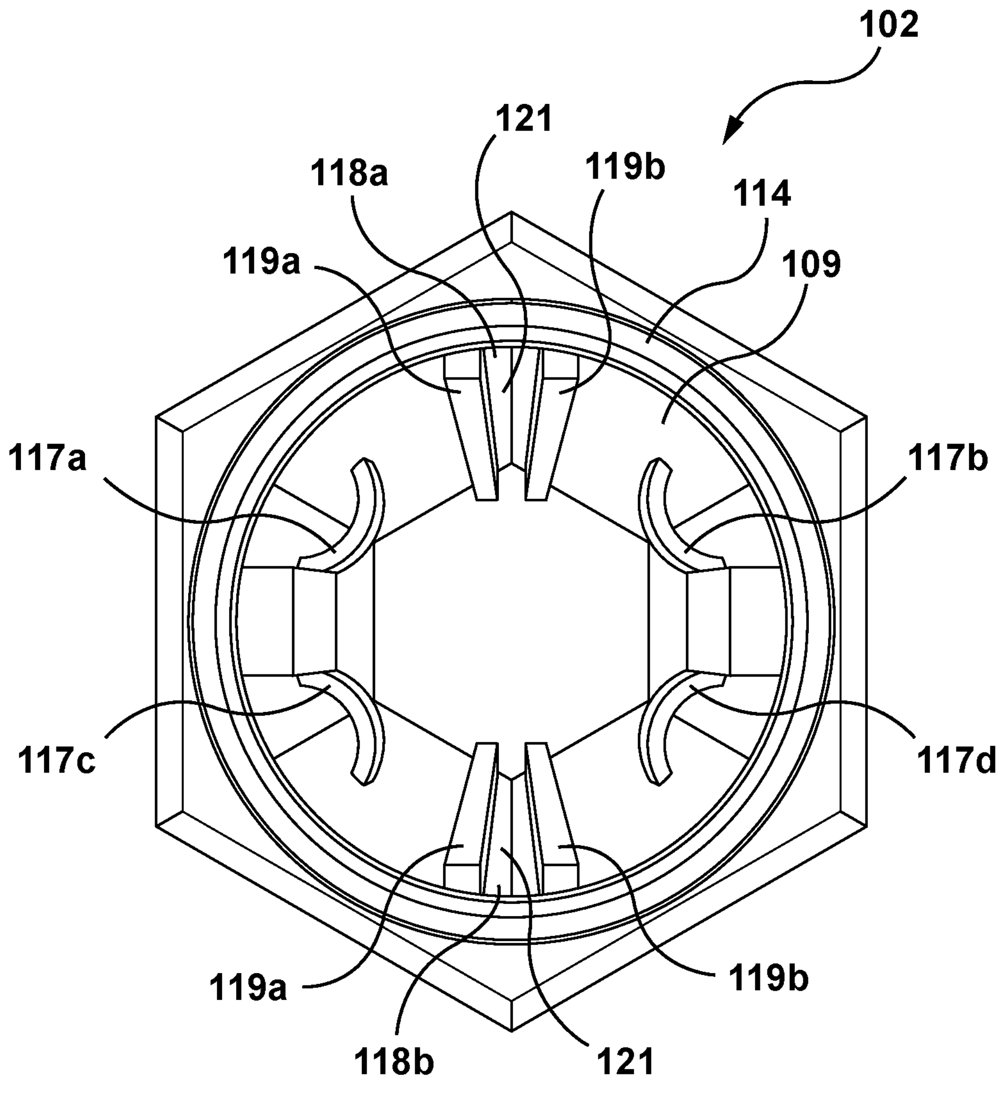
FIG. 3 is a top down view of the housing of FIG. 2.
Figure 4:
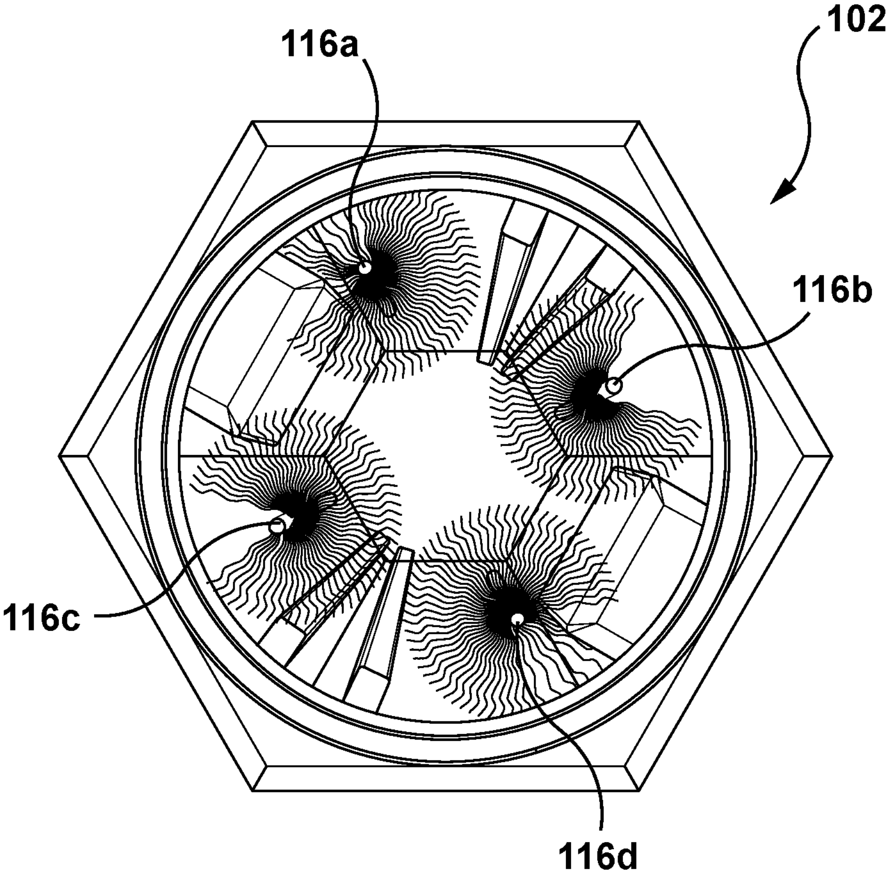
FIG. 4 is a top down view from above of the housing of FIG. 2 including brushes.

As shown in FIG. 2, housing 102 has a top wall 104, a bottom wall 106 and a peripheral wall 108 extending therebetween. In the embodiment shown in FIGS. 1-3, the inner surface 109 and the outer surface 111 of peripheral wall 108 each have six sides, giving housing 102 a hexagonal shape. In other embodiments, outer surface 111 of peripheral wall 108 each may have a different number of sides to provide the housing 102 with a different shape. For instance, the outer surface 111 of housing 102 may have a circular shape, a triangular shape, a square shape, a rectangular shape, a pentagonal shape, an octagonal shape or the like. Similarly, inner surface 109 of peripheral wall 108 may also have a different number of sides. Again, inner surface 109 may have a circular shape, a triangular shape, a square shape, a rectangular shape, a pentagonal shape, an octagonal shape or the like.

Housing 102 is generally hollow with top wall 104, bottom wall 106 and peripheral wall 108 co-operating to define a cavity 110 of housing 102. Cavity 110 is sized and shaped to receive plunger 120, described in greater detail below, as well as a ball thereon (e.g. a golf ball). It should be noted that although the devices described herein are described in the context of cleaning a golf ball, the devices may be used to clean other balls of similar sizes (e.g. having a diameter of about 42.67 mm). Additionally, cavity 110 is sized and shaped to receive and retain a fluid (e.g. water) and/or detergent to assist in cleaning the ball.

Top wall 104 has an opening 112 leading to cavity 110. Opening 112 is sized and shaped to provide for plunger 120 and the ball to pass there through. Top wall 104 may include a flange 114 extending upwardly therefrom to secure the cap 103 to the housing 102. Flange 114 may define the opening 112. Flange 114 may be configured in any appropriate manner to secure cap 103 to housing 102. For instance, in the embodiments shown in the figures herein, flange 114 is threaded to threadingly receive cap 103 and seal ball-washing device 100.

Turning to FIGS. 3-6, illustrated therein are two embodiments of housing 102 showing internal brushes in different positions. As noted above, housing 102 is configured to retain at least one brush 116 to engage an outer surface of a ball received by the housing 102 to clean the outer surface of the ball as the ball moves upwardly and downwardly within the cavity 110. Brushes 116 are disposed or positioned within housing 102 to clean the outer surface of the ball 102 and to provide for plunger 120 to slide vertically unobstructed by the brushes 116 within housing 102. In at least one embodiment, housing 102 includes two brushes 116. In at least one embodiment, housing 102 includes four brushes 116. In at least one embodiment, the brushes 116 are positioned to be equidistant from each other within cavity 110.

Brushes 116 may be retained within housing 102 in many different ways. For instance, brushes 116 may be mounted to inner surface 109 of housing 102 or may rest against inner surface 109. In the embodiment of housing 102 shown in FIGS. 3 and 4, housing 102 is configured to retain four brushes **116*a*-116*d* in corners of peripheral wall 108. To retain the brushes 116*a*-116*d*, this embodiment of housing 102 includes four brush-retaining brackets 117*a*-117*d*, respectively. Each of brush retaining brackets 117*a*-117*d* has is configured to at least partially surround a portion of a respective brush 116*a*-116*d* to retain their respective brush 116*a*-116*d* in the housing 102. Each brush-retaining bracket 117*a*-117*d* may have any shape sufficient to retain a respect brush 116*a*-116*d* in housing 102. For instance, the brush-retaining brackets 117*a*-117*d* shown in FIGS. 3-6** have an arcuate shape.

Figure 5:
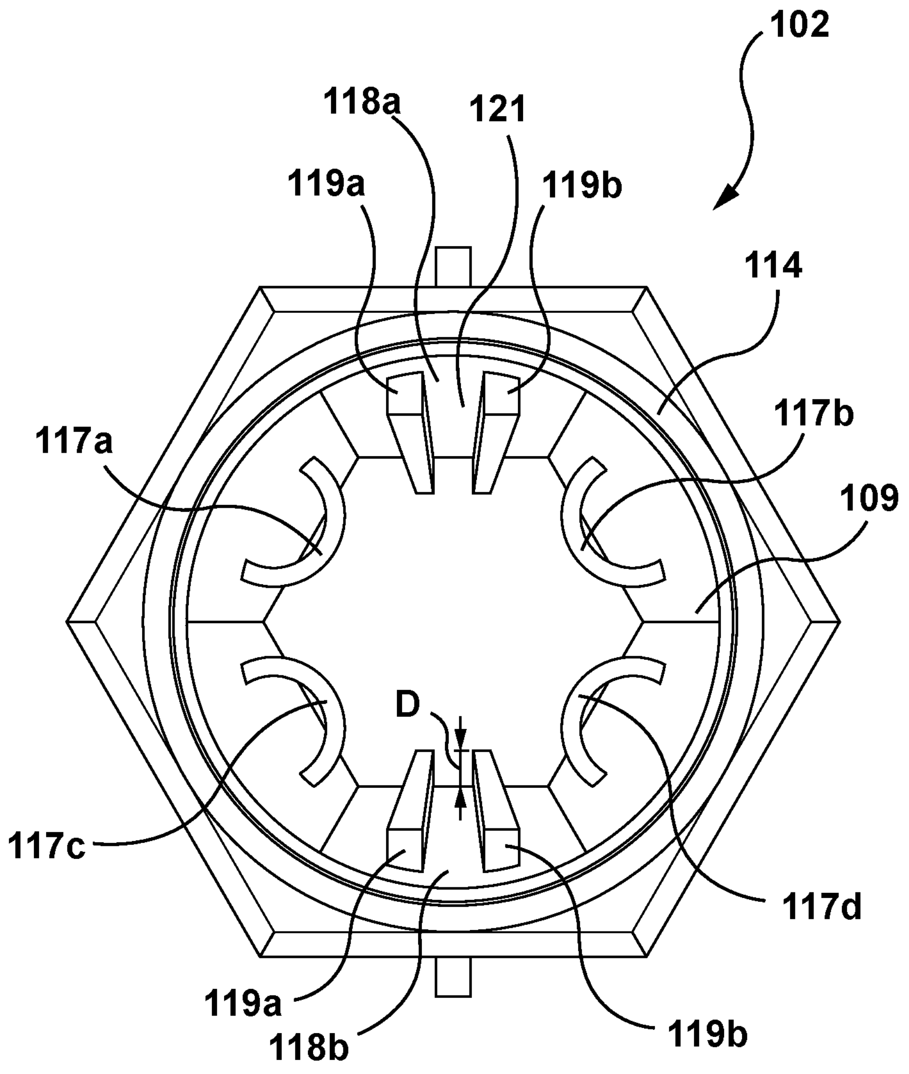
FIG. 5 is a top down view of another embodiment of a housing of a ball-washing device according to at least one embodiment described herein.
Figure 6:
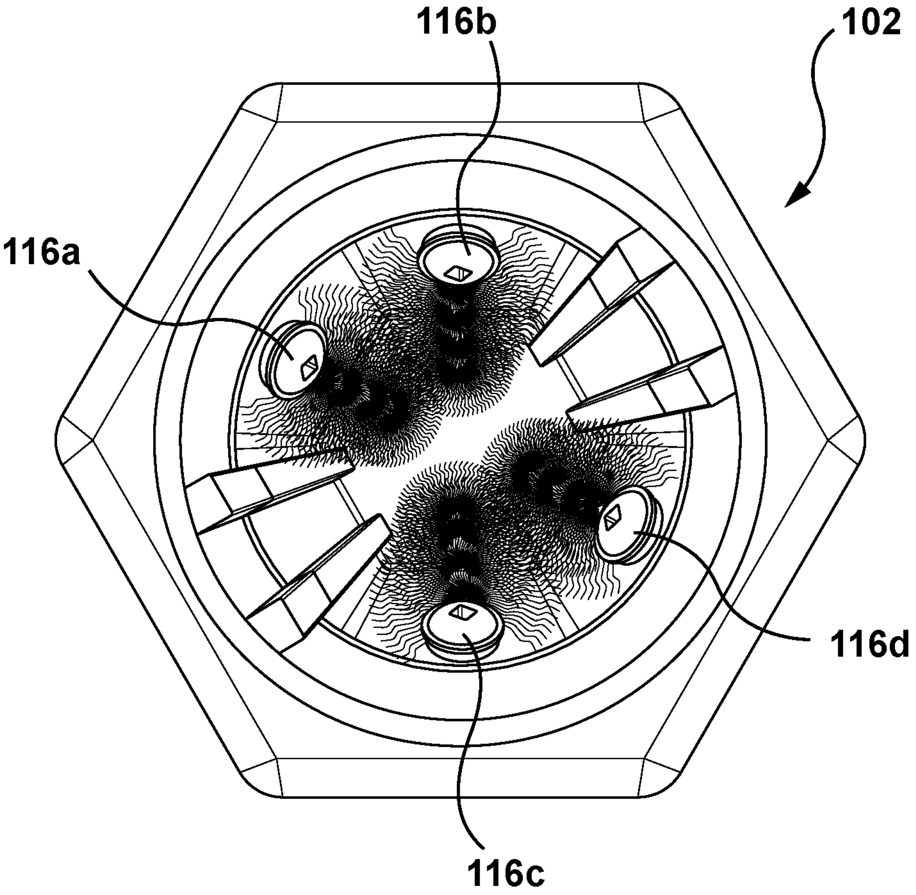
FIG. 6 is a perspective view from above of the housing of FIG. 5 including brushes.

In the embodiment of housing 102 shown in FIGS. 5 and 6, housing 102 is again configured to retain four brushes **116*a*-116*d***. However, in this embodiment the four brushes

116*a*-116*d* are retained on flat portions of peripheral wall 108. Specifically, in this embodiment, inner surface 109 of housing 102 has six flat portions (i.e. housing 102 is hexagonal) and four of the six flat portions include a brush-retaining bracket 117*a*-117*d*. Again, to retain the brushes 116*a*-116*d*, each of the four brush-retaining brackets 117*a*-117*d*, respectively, retains a respective brush of brushes 116*a*-116*d*.

In at least one embodiment, one of the brushes 116 may have a diameter that is greater than the other brush(es) of housing 102. For example, as shown in FIG. 6, brush 116*c* may have a diameter that is greater than the diameter of brushes 116*a*, 116*b* and 116*d*, which all may have a same diameter. In this embodiment, brush 116*c* may impart a greater force on the ball while the ball travels vertically within plunger 120 and may tend to rotate or spin the ball as is travels vertically within housing 102. In other embodiments, two of the brushes 116 may have a first diameter and two of the brushes 116 may have a second diameter, the first diameter being greater than the second diameter. In this embodiment, the brushes having the first diameter may be positioned adjacent to each other to impart a greater force on the ball than the two brushes having the second diameter. This may provide for the ball to rotate or spin as it travels vertically within housing 102.

Housing 102 also includes one or more guides 118 to guide the plunger 120 as it travels (e.g. slides) vertically through housing 102. In the embodiments shown in the figures, housing 102 includes two guides 118*a*, 118*b* spaced apart from one another and mounted to inner surface 109 of housing 102.

In at least one embodiment, guides 118*a*, 118*b* are positioned on opposed sides of housing 102. Guides 118*a*, 118*b* may have any shape to guide the plunger 120 as it slides vertically within housing 102. In the embodiments shown in the figures, each of the guides 118*a* and 118*b* include two members 119*a*, 119*b*, respectively, spaced apart from each other and extending vertically along inner surface 109 of peripheral wall 108. Members 119*a*, 119*b* may be mounted to inner surface 109 or may be integral with peripheral wall 108. Members 119*a*, 119*b* are spaced apart from each other to define a slot 121 therebetween and extend inwardly from inner surface 109 of peripheral wall 108 into cavity 110 to engage edges 127 of body portion 122 of plunger 120 (described in more detail below) and guide the plunger 120 as it travels vertically through the cavity 110. Slot 121 is shaped to receive side edges 127 of the body portion 122 of plunger 120 so members 119*a*, 119*b* can guide plunger 120 as it travels vertically within the cavity 110.

In at least one embodiment, housing 102 may be formed by three-dimensional printing and the members 119*a*, 119*b* may be integral with the peripheral wall 108 of housing 102. Members 119*a*, 119*b* generally extend vertically from bottom wall 106 to or adjacent to top wall 104 to provide for the plunger 120 to slide vertically along a height of housing 102. Members 119*a*, 119*b* extend inwardly from inner surface 109 of peripheral wall 108 a distance D (see FIG. 5) sufficient to provide for side edges 127 of the body portion 122 of plunger 120 to fit within slot 121 and engage the members 119*a*, 119*b*.

Figure 7A:
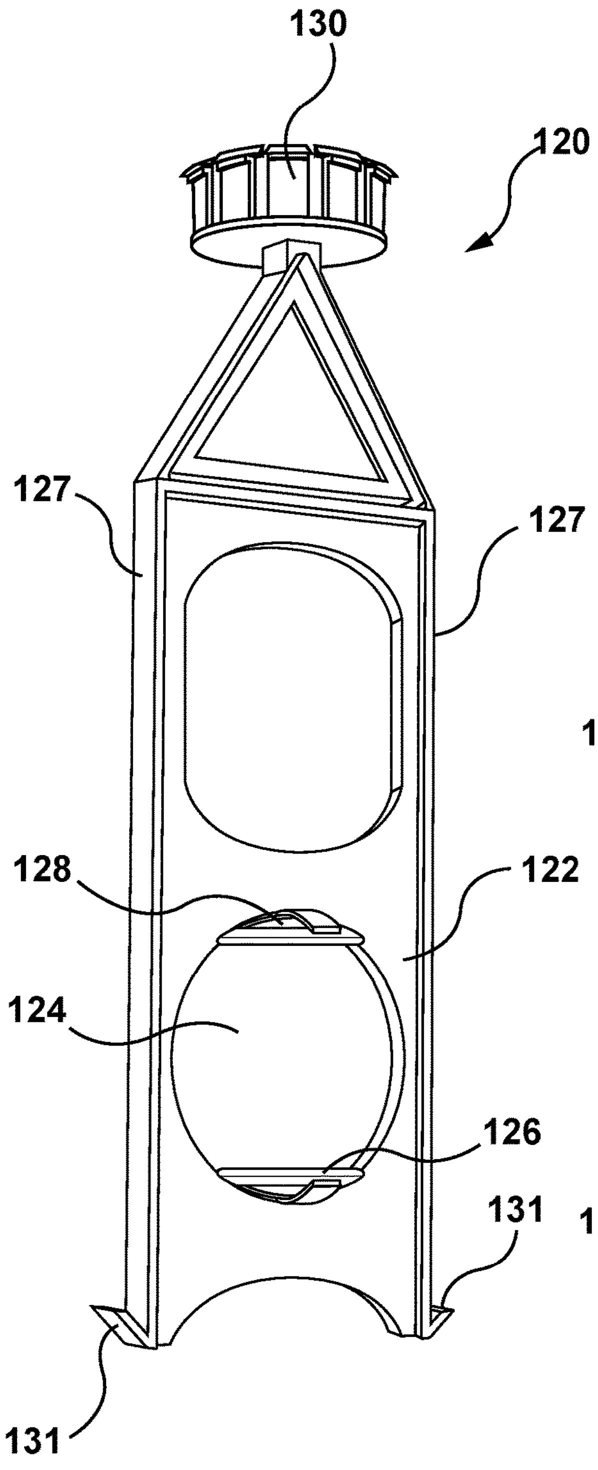
FIG. 7A is front perspective view of a plunger of a ball-washing device according to at least one embodiment described.
Figure 7B:
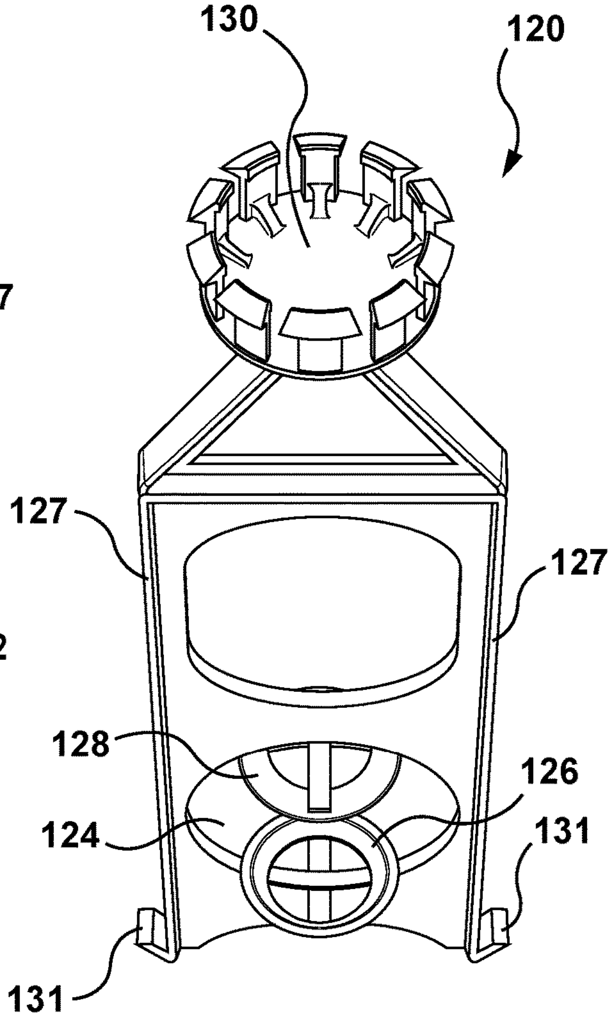
FIG. 7B is a perspective view from above of the plunger of FIG. 7A.

As noted above, ball-washing device 100 also includes a plunger 120 slidably coupled to the housing 102. FIGS. 7A and 7B show one embodiment of plunger 120. Plunger 120 is slidably coupled to the housing 102 by members 119*a*, 119*b* as described above.

Plunger 120 includes a body portion 122 that is configured to retain at least one ball therein as the plunger 120 travels vertically within the housing 102. In the embodiment shown in FIGS. 7A and 7B, the body portion 122 is generally shaped as a rectangular plate having side edges 127 shaped to fit within the slots 121 and an aperture 124 that is shaped for a ball to fit therein. Aperture 124 may be centered laterally within the body portion 122 and have a circular shape with a diameter slightly bigger than the diameter of a golf ball.

Body portion 122 of plunger 120 includes a resting portion 126 positioned within the aperture 124 to receive and support the ball as plunger 120 travels vertically within the housing 102. Resting portion 126 has a curved shape (e.g. to conform to an outer surface of a golf ball) to support the ball thereon and inhibit the ball from rolling off.

Body portion 122 of plunger 120 may optionally include an upper portion 128 positioned above the resting portion 126. Upper portion 128 and resting portion 126 may be spaced apart from each other by a distance slightly greater than a diameter of a golf ball. Upper ball resting portion 128 may also have a curved shape (e.g. to conform to an outer surface of a golf ball). Upper portion 128 may assist in retaining the ball on the resting portion 126 when the ball travels vertically within the housing 102. For instance, when the ball is withdrawing from the housing 102 it may be inclined to fall off of the resting portion 126. Upper portion 128 may assist in retainer the ball on the resting portion 126 when it is withdrawn from the housing 102.

In the embodiment shown in FIGS. 7A and 7B, plunger 120 includes a triangular neck portion 129 extending upwardly from the body portion 122 and a handle portion 130 extending upwardly from a top of the neck portion 129. In at least one embodiment, handle 130 may extend through the opening 112 when the plunger 120 is positioned inside cavity 110. In at least one embodiment, handle 129 may couple to cap 103. For instance, handle 129 may include a lip to frictionally engage an inner surface of cap 103, or may include threads to threadingly engage an inner surface of cap 103. A user may grasp the handle 130 or cap 103 when the body 122 is within the cavity 110 to manipulate the plunger 120 and withdraw the resting portion 126 from the cavity 110 to place a ball thereon or, alternatively, remove a ball therefrom.

Plunger 120 optionally includes one or more stoppers 131 positioned on a lower portion of body 122. Stoppers 131 inhibit the plunger 120 from being completely withdrawn (i.e. removed) from the housing 102. In the embodiment of plunger 120 shown in FIGS. 7A and 7B, stoppers 131 extend outwardly from sides edges 127 of the plunger 120 and increase the width of the plunger 120 to be greater than a diameter of opening 112 of housing 102. As plunger 120 is removed from cavity 110, stoppers 131 slide upwardly within slots 121 of housing 102 and engage an inner surface of upper wall 104 to inhibit plunger 120 from being removed from housing 102.

Housing 102 may optionally include one or more retainer elements 132 on outer surface 111 thereof to mount and/or couple the ball-washing device 100 to another article, such as but not limited to a golf bag, a golf cart, a belt or the like.

Turning now to FIGS. 8-15 illustrated therein is another embodiment of a ball-washing device. For clarity, it should be appreciated that for simplicity and clarity of illustration, where considered appropriate, reference numerals used to describe the ball-washing device 100 may be repeated among FIGS. 8-15 to indicate corresponding or analogous element, where the reference numeral used FIGS. 8-15 to indicate a feature corresponding to a feature of the ball-washing device 100 is increased by 800.

Figure 8:
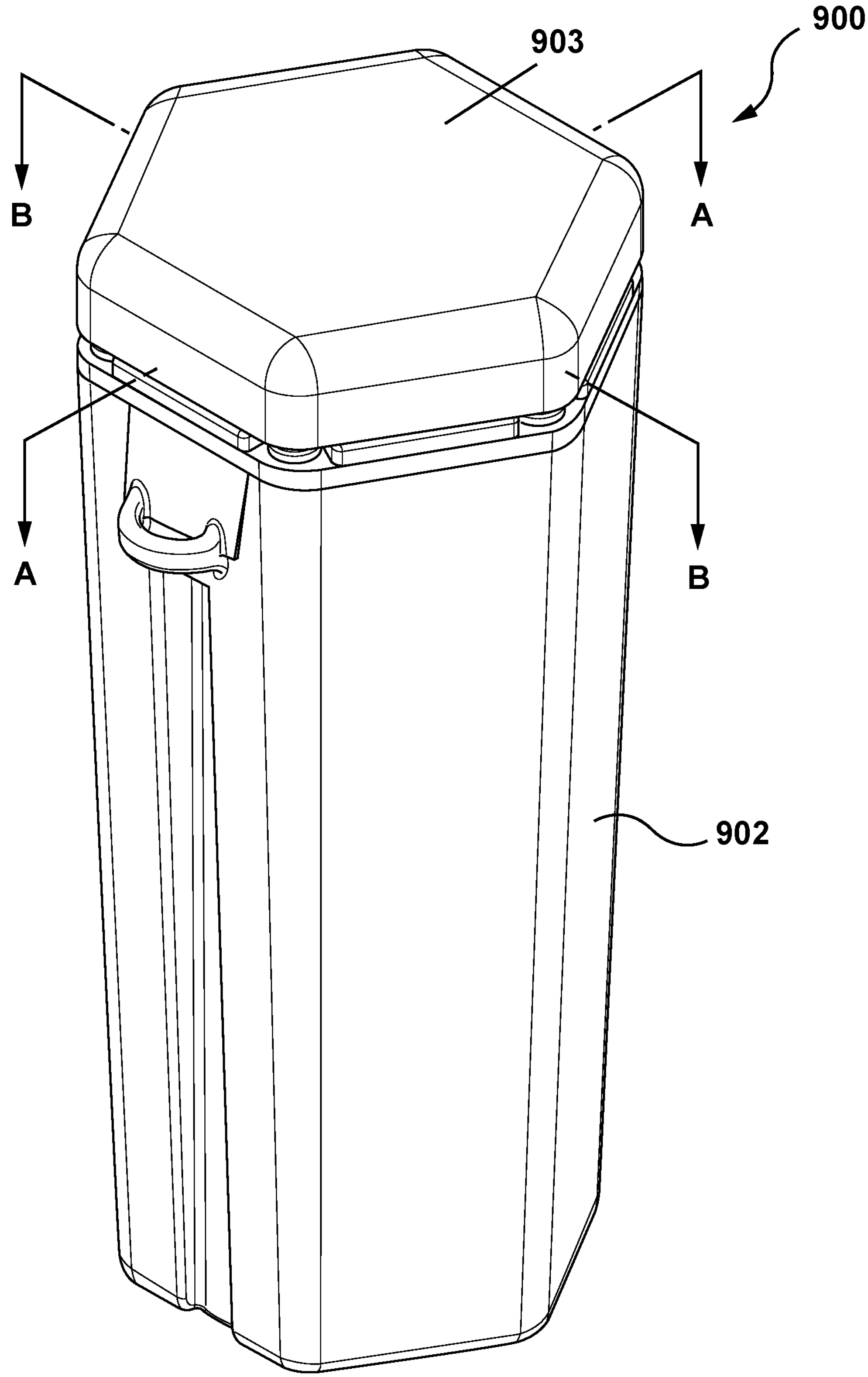
FIG. 8 is a perspective view from above of another embodiment of a ball-washing device.
Figure 9:
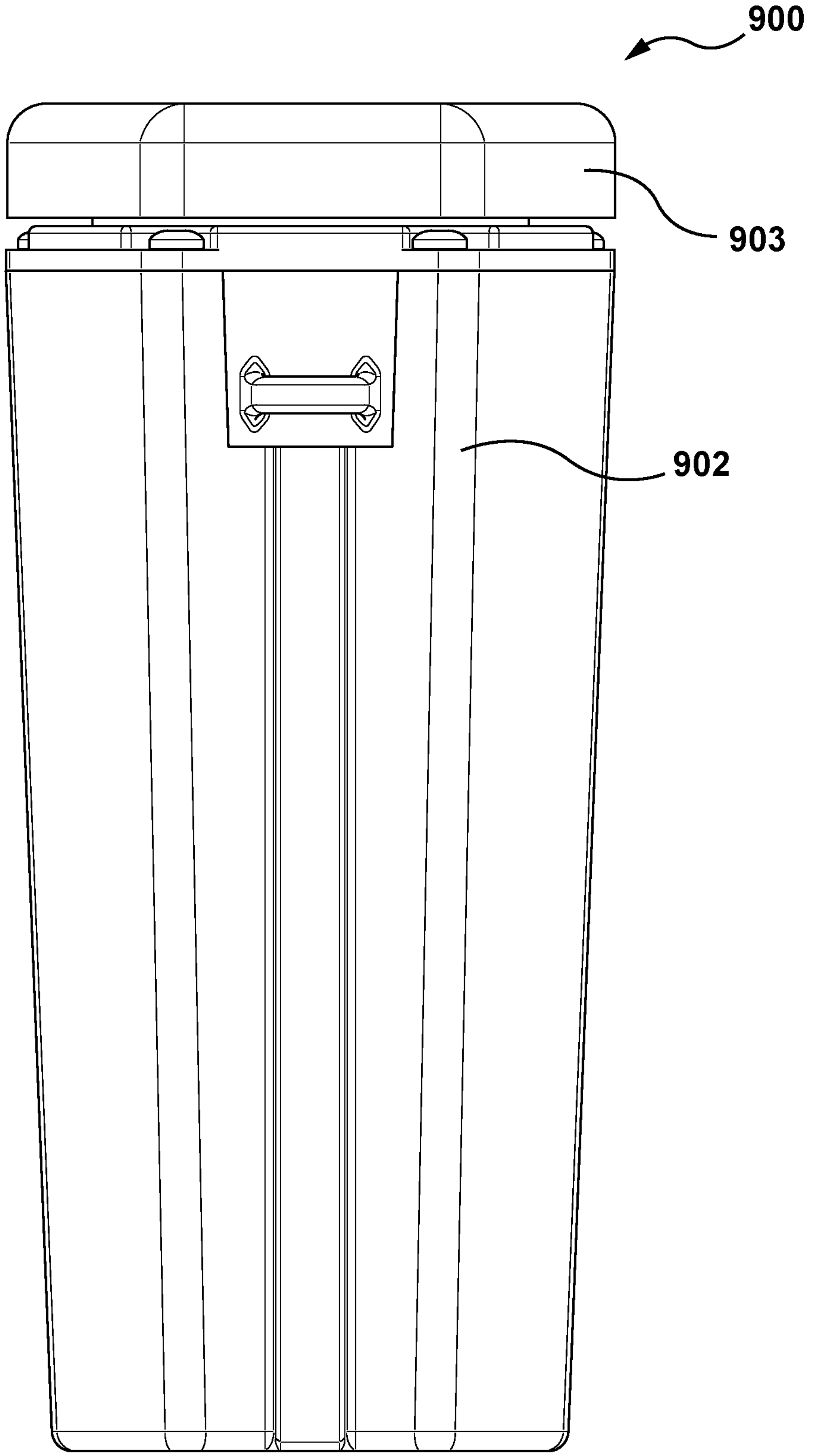
FIG. 9 is a side view of the ball-washing device of FIG. 8.

Device 900 also includes housing 902 and cap releasably securable (e.g. by screwing) to the housing 902. For example, FIG. 8 shows a perspective view from above of the device 900 and FIG. 9 shows a side view of the device 900, each view showing cap 903 secured to housing 902.

Figure 10:
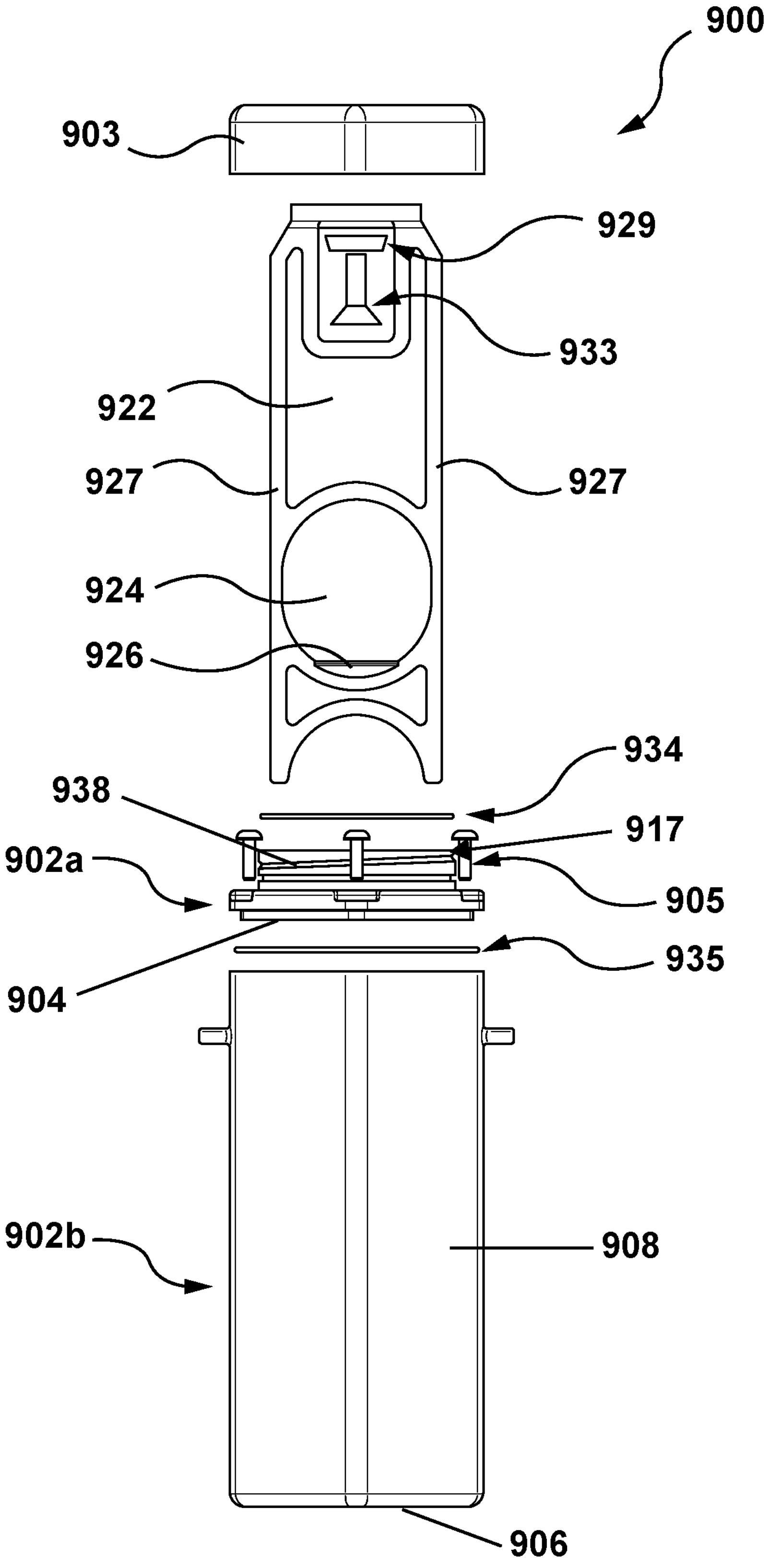
FIG. 10 is an exploded view of the ball-washing device of FIG. 8.

In the embodiment of housing 902 shown in FIGS. 8-15, housing 902 includes an upper portion 902*a* and a lower portion 902*b*, each of which is shown in the exploded view of device 900 shown in FIG. 10. Upper portion 902*a* can be secured to lower portion 902*b* in any manner using any appropriate fastening mechanism(s), including but not limited to fasteners 905 shown in FIG. 10. Housing 902 having upper portion 902*a* and lower portion 902*b* may ease manufacturing of device 900, for instance, by providing for the housing 902 to be formed by techniques such as injection molding. FIG. 10 also shows o-rings 934 and 935. O-ring 934 may be positioned between the cap 903 and the upper portion 902*a* to seal the cap 903 and the upper portion 902*a* when the cap 903 is secured to the top portion 902*a*. O-ring 935 may be positioned between the upper portion 902*a* and the lower portion 902*b* to seal the upper portion 902*a* and the lower portion 902*b* when the upper portion 902*a* is secured to the lower portion 902*b*.

Figure 11:
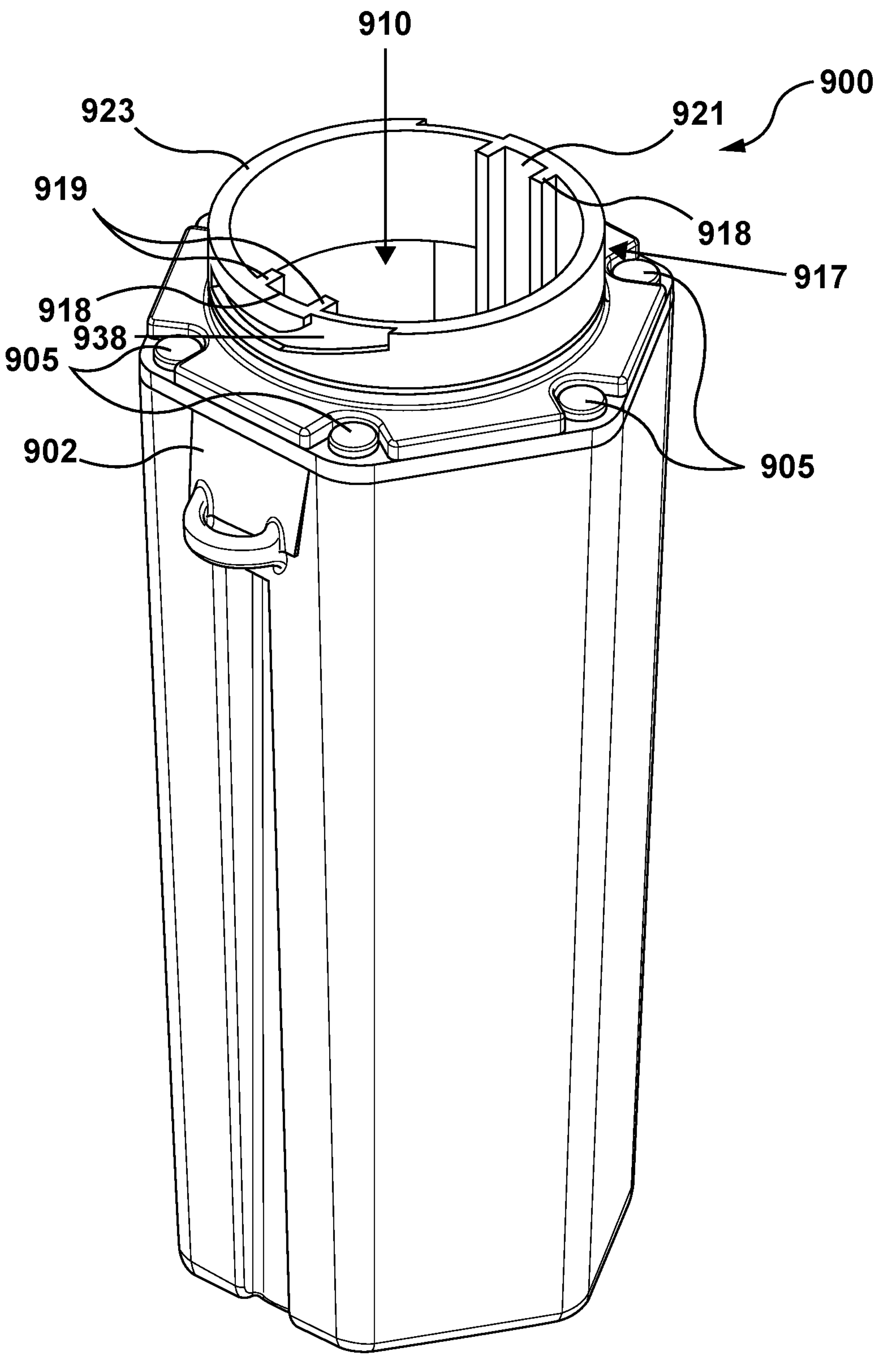
FIG. 11 is perspective view from above of a housing of the ball-washing device of FIG. 8, according to at least one embodiment.

In at least one embodiment, top wall 904 of housing 902 may be provided by a lower, internal surface of the upper portion 902*a* such that, when upper portion 902*a* is secured to lower portion 902*b*, top wall 904 co-operates with an inner surface of peripheral wall 908 and an inner surface of bottom wall 906 to define cavity 910 (see FIG. 11).

Figure 12:
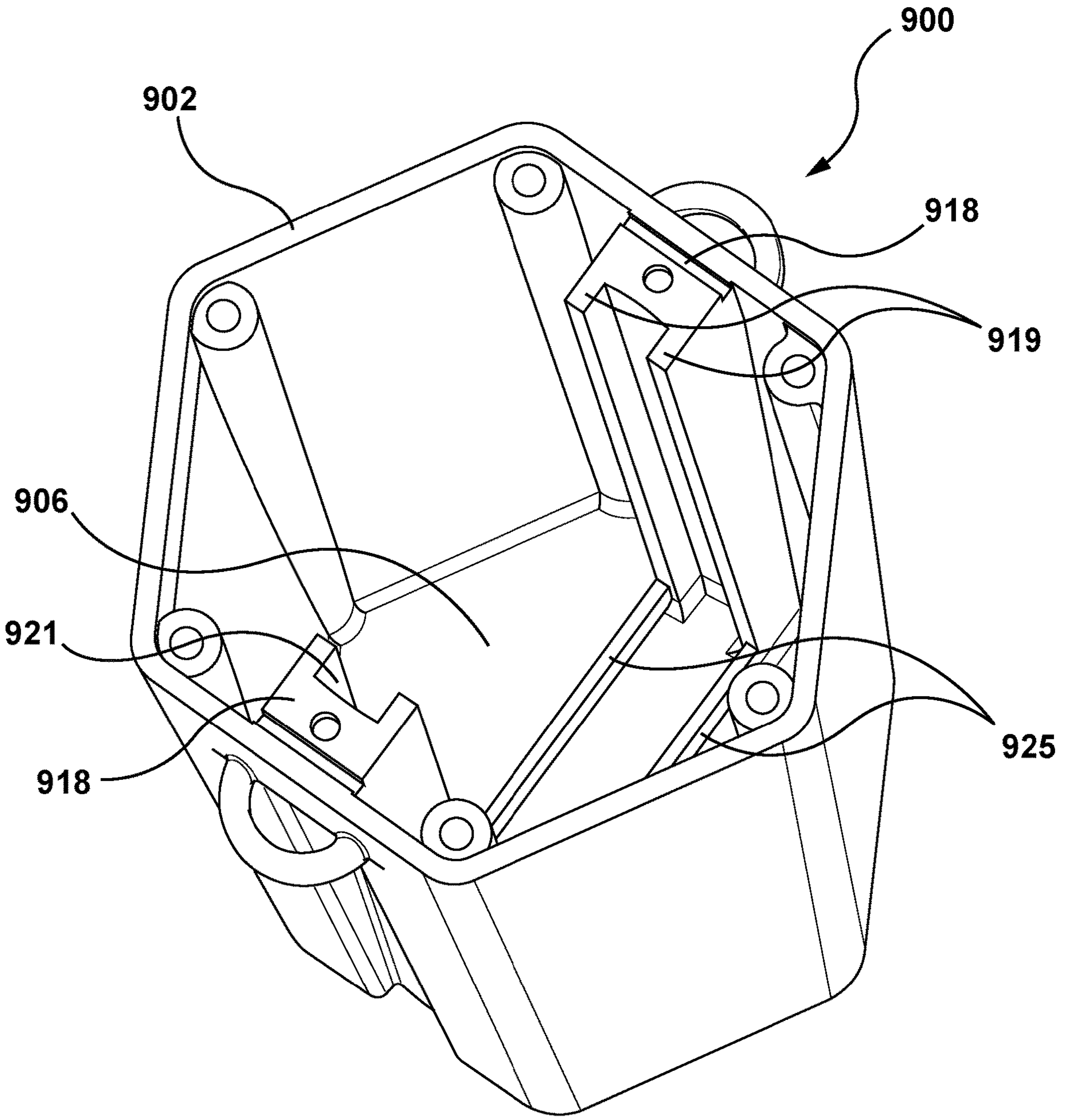
FIG. 12 is a perspective view from above of the housing of FIG. 11 showing a cavity and internal structures thereof.

FIGS. 11 and 12 show that upper portion 902*a* and lower portion 902*b* of housing 902 each include guides 918 on an inner surface thereof that extend to an upper edge 923 of upper portion 902*a*. Guides 918 appear as previously described with reference to FIGS. 1-6, each having two members 919 spaced apart from each other to form a slot 921 therebetween. In at least one embodiment, members 919 may be integral with peripheral wall 908. Upper portion 902*a* and lower portion 902*b* each includes guides 918 that are configured to be aligned when upper portion 902*a* is secured to the top of lower portion 902*b*. Slot 921 is sized and shaped to receive side edges 927 (see FIG. 13) of the body portion 922 of plunger 920 (described in greater detail below).

In at least one embodiment, upper portion 902*a* may include a collar 917 for releasably coupling cap 903 thereto. Collar 917 may optionally include one or more collar slots 938 for receiving a portion of cap 903 therein. For example, FIG. 12 also shows that bottom wall 906 of housing 902 optionally may include ribs 925 extending upwardly therefrom. Ribs 925 may be spaced apart from each other by a spacing about equal to a thickness of body portion 922 of plunger 920 to receive the body portion 922 of plunger 920 therein when the plunger 920 is inserted into housing 902. Ribs 925 may inhibit lateral or rotational movement of the body portion 922 of plunger 920 when it is completely inserted into the housing 902. Ribs 925 may also engage one or more of the brushes 916 (not shown) and urge the brushes 916 away from the body portion 922 and/or towards the inner surface of the peripheral wall 908 of housing 902. Brushes 916 may also be retained against to the inner surface of the peripheral wall 908 by cap 903. For instance, an inner surface of cap 903 may include a recessed portion 937 (see FIG. 13) sized and shaped to receive a top portion of one or more brushes 916 therein. When the top portion of one or more brushes 916 is received in recessed portion 937, the cap 903 can inhibit the one or more brushes 916 from shifting laterally away from the peripheral wall 908 of housing 902. Brushes 916 may also be secured within cavity 910 and against to the inner surface of the peripheral wall 908 by being secured to top wall 904 (i.e. an underside of upper portion 902*a*).

Figure 13:
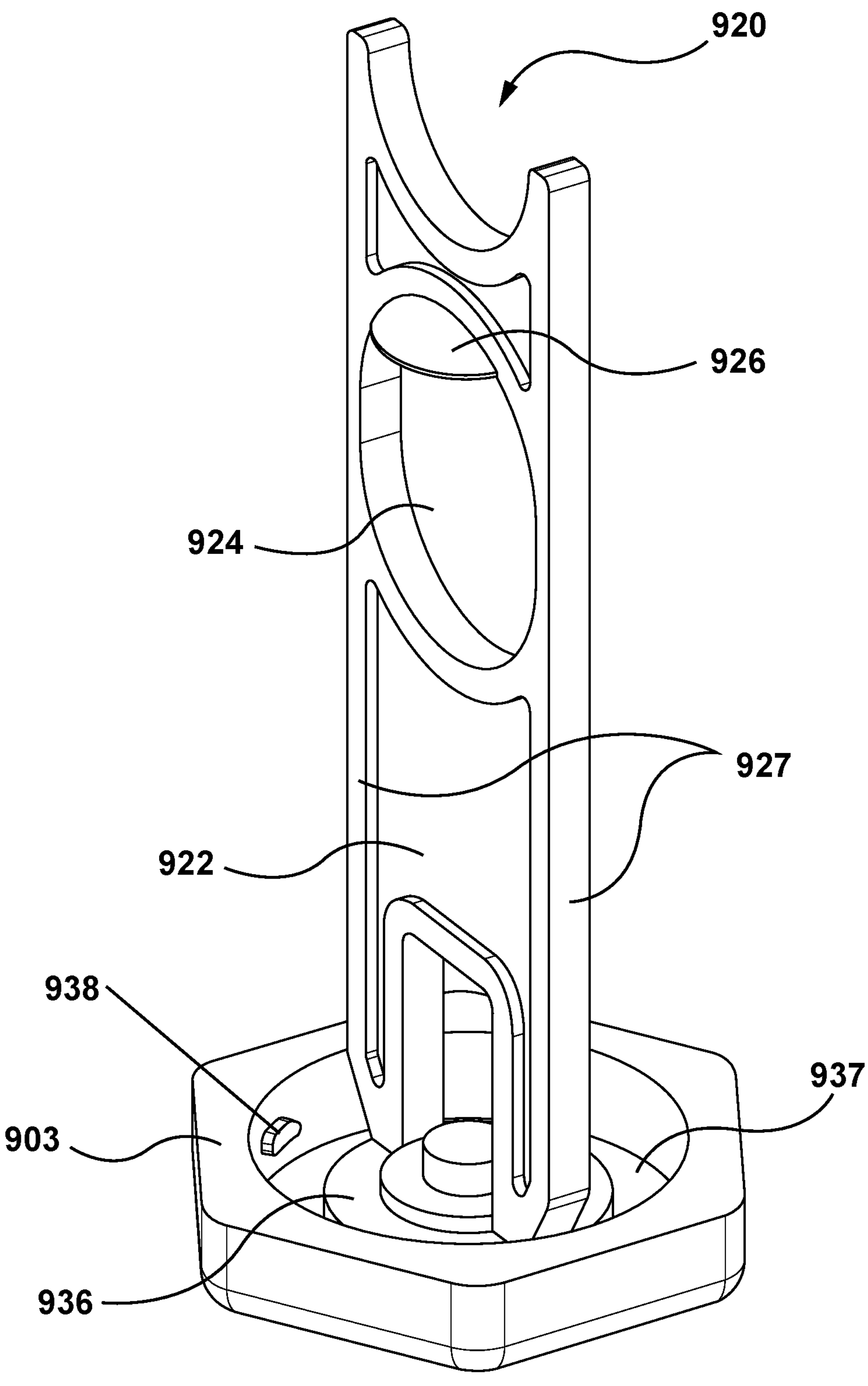
FIG. 13 is a perspective view of a plunger of the ball-washing device of FIG. 11, according to at least one embodiment.

FIG. 13 shows an inverted perspective view of plunger 920 showing how the body portion 922 couples to the cap 903. Body portion 922 is rotationally coupled to cap 903 such that cap 903 can rotate relative to body 922, including but not limited to when body portion 922 is inserted into housing 903. Cap 903 can therefore be rotatably secured to the housing 902 (e.g. upper portion 902*a*) without body portion 922 rotating within housing 902. For example, in one example, plunger 920 may be secured to cap 903 by fastener 933 and washer 929. For instance, fastener 933 can be inserted through washer 929 and an aperture (not shown) in neck portion 941 of body 922 and into a downward extending projection 942 on underside of cap 903 to rotatably secure the cap 903 to the plunger 920. Downward extending projection 942 may have an opening and threads therein to threadingly receive fastener 933. Neck portion 941 may surround downward extending projection 942 and rotate around neck portion 941 while fastener 933 secures the body 922 to cap 903.

Figure 14:
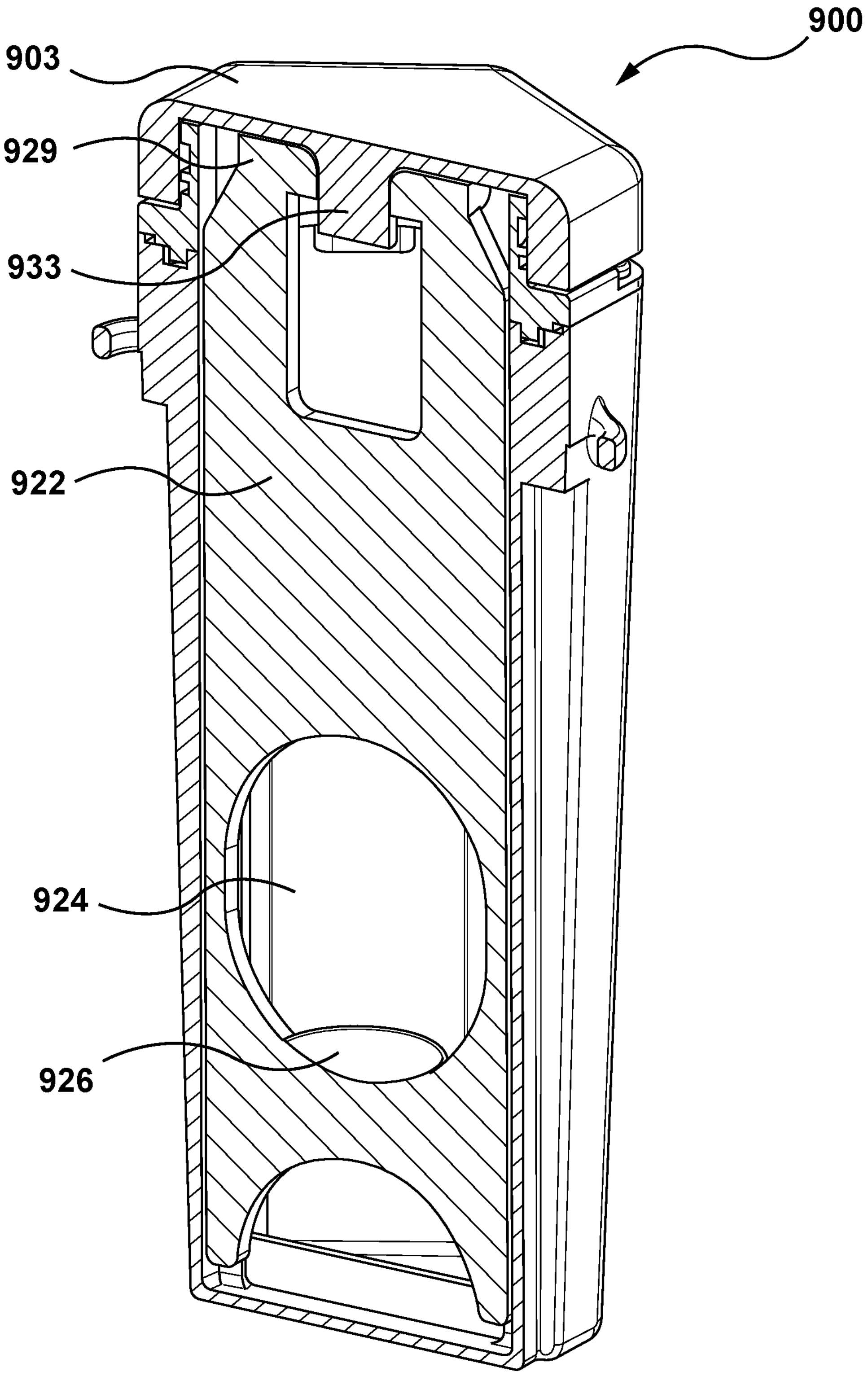
FIG. 14 is a cross-sectional view of the ball-washing device of FIG. 8 showing the plunger positioned within the housing.
Figure 15:
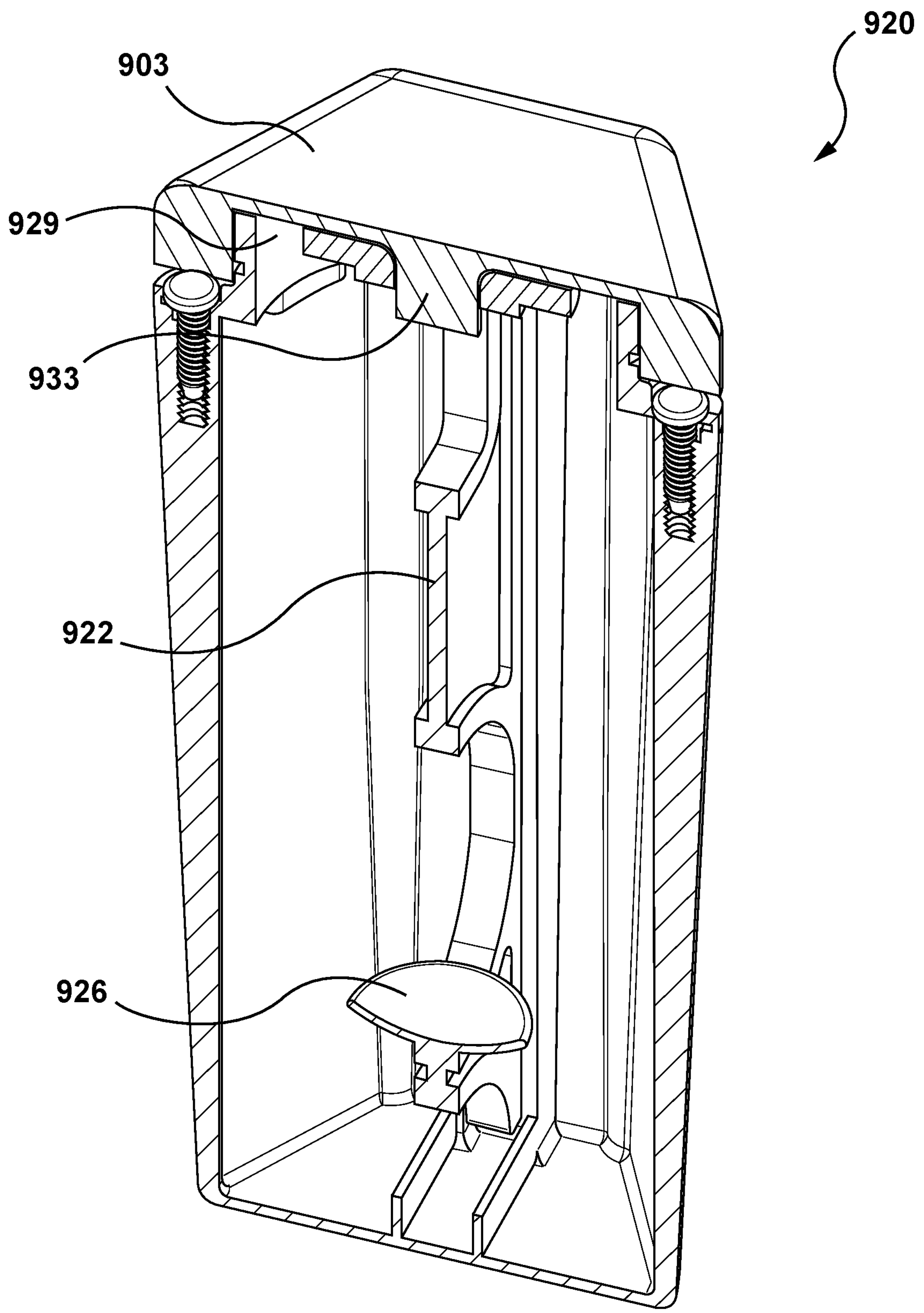
FIG. 15 shows a second cross-sectional view of the ball-washing device of FIG. 8 showing the plunger positioned within the housing.

Body portion 922 of plunger 920 is also configured to retain at least one ball as the plunger 920 travels vertically within the housing 902. Body portion 922 generally has a rectangular plate shape having side edges 927 (shown in FIG. 13) shaped to fit within the slots 921 of guides 918. Body portion 922 includes a resting portion 926 positioned within opening 924 of body portion 922 to receive and support the ball as plunger 920 travels vertically within the housing 902. A user of the device places the ball on the resting portion 926 and within the opening 924 when the plunger 920 is at least partially withdrawn from the housing 902. Resting portion 926 has a curved shape (e.g. to conform to an outer surface of a ball, such as a golf ball) to support the ball thereon and inhibit the ball from rolling off. FIG. 14 shows a cross-sectional view of the device 900 across the line A-A of FIG. 8 and FIG. 15 shows a cross-sectional view of the device 900 across the line B-B of FIG. 8.

In at least one embodiment, cap 903 may include projections 940 configured to slide into collar slots 938 for rotationally securing cap 903 to housing 902.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

What is claimed is:

1. A ball-washing device comprising:

a housing comprising:

a top wall;

a bottom wall;

a peripheral wall having six sides, the six sides including a first side, a second side, a third side, a fourth side, a fifth side and a sixth side, the first side being between and adjacent to the second side and the sixth side, the second side being between and adjacent to the first side and the third side, the third side being between and adjacent to the second side and the fourth side, the fourth side being between and adjacent to the third side and the fifth side, the fifth side being between and adjacent to the fourth side and the sixth side, the sixth side being between and adjacent to the fifth side and the first side, each side of the six sides having an inner surface and an outer surface, each of the inner surfaces extending between the top wall and the bottom wall to define a hexagonal cavity of the housing, the outer surfaces providing for a perimeter of the housing to have a hexagonal shape, the top wall having an opening shaped to receive a ball into the cavity;

a pair of guides including a first guide and a second guide, the first guide being positioned on the first side of the peripheral wall and the second guide being positioned on the fourth side of the peripheral wall, each guide extending within the cavity in a direction parallel to a longitudinal axis of the housing; and four brushes positioned within the cavity of the housing, the four brushes including a first brush positioned directly adjacent to the second side of the peripheral wall, a second brush positioned directly adjacent to the third side of the peripheral wall, a third brush positioned directly adjacent to the fifth side of the peripheral wall and a fourth brush positioned directly adjacent to the sixth side of the peripheral wall, each brush:

extending from the top wall to the bottom wall within the cavity in the direction parallel to the longitudinal axis;

and having bristles forming a convex perimeter surface extending inwardly from the peripheral wall, the convex perimeter surface extending along the longitudinal axis from the top wall to the bottom wall within the cavity; and a plunger comprising:

a body portion having:

a pair of side edges, each of the side edges being configured to slidingly engage with a respective guide of the pair of guides when the body portion is inserted into and removed from the cavity, and a resting portion to retain the ball as the body portion moves in the direction parallel to the longitudinal axis of the housing; and a cap rotatably coupled to the body portion and configured to rotate relative to the body portion to secure the plunger to the housing when the body portion is in the cavity.

2. The ball-washing device of claim 1, wherein the housing has a first width at an upper portion of the housing and a second width at a lower portion of the housing, the first width being greater than the second width and the peripheral wall tapering inwardly along the longitudinal axis of the housing from the upper portion to the lower portion.

3. The ball-washing device of claim 1, wherein the cap is coupled to the body portion by a cap fastener to provide for the cap to rotate relative to the body portion.

4. The ball-washing device of claim 1, wherein two of the brushes are configured to impart a greater force on the ball than another two of the brushes as the ball travels in the direction parallel to the longitudinal axis of the housing.

5. The ball-washing device of claim 1, wherein each of the brushes is positioned to be equidistant from each other within the cavity.

6. The ball-washing device of claim 1, wherein each of the brushes are unadhered to the peripheral wall.

7. The ball-washing device of claim 1, wherein each of the brushes are secured to the top wall.

8. The ball-washing device of claim 6, wherein each of the brushes are retained against the peripheral wall by a retaining member that is a divider wall extending upwardly from the bottom wall of the housing.

9. The ball-washing device of claim 1, wherein two of the brushes extend inwardly into the cavity a distance greater than another two brushes.

10. The ball-washing device of claim 1, wherein each guide of the pair of guides defines a slot configured to receive one of the pair of side edges to guide the plunger as the plunger slides within the cavity.

11. The ball-washing device of claim 10, wherein a lower portion of each of the guide members extends inwardly from an inner surface of the bottom wall to engage sides of the plunger as the plunger passes through the opening.

12. The ball-washing device of claim 10, wherein the guide members extend upwardly to an upper edge of a collar of the housing.

13. The ball-washing device of claim 1, wherein the plunger has a width that is less than a diameter of the opening.

14. The ball-washing device of claim 1, wherein the housing includes a collar having a slot and the cap is configured to be rotatably secured to the housing via the slot.

15. The ball-washing device of claim 14, wherein the cap includes one or more projections configured to be received in the slot.

16. The ball-washing device of claim 3, wherein the cap fastener is received in a downwardly extending portion of the cap.

17. The ball-washing device of claim 16, wherein the cap fastener passes through an aperture in a neck portion of the body of the plunger and is received in the downwardly extending portion of the cap.

18. The ball-washing device of claim 17, wherein the neck portion surrounds the downward extending projection.

* * * * *